July 23, 1929.  J. H. DEPPELER  1,721,548
METHOD OF WELDING RAILWAY RAILS AND THE LIKE
Filed Jan. 28, 1928  2 Sheets-Sheet 1

INVENTOR
John H. Deppeler
BY
HIS ATTORNEY

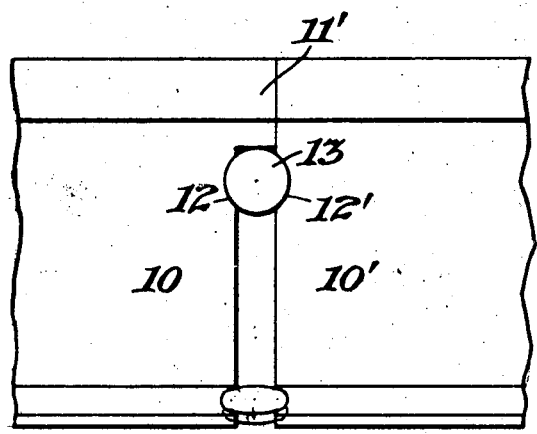
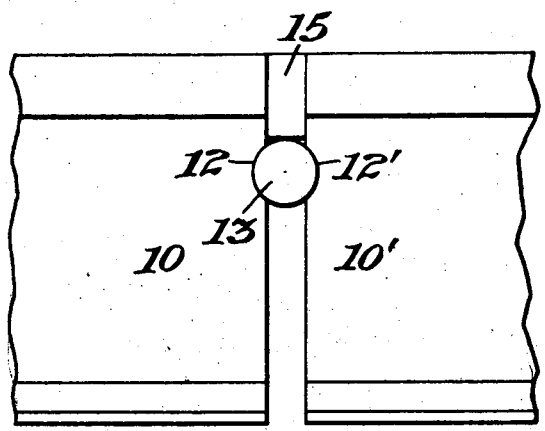
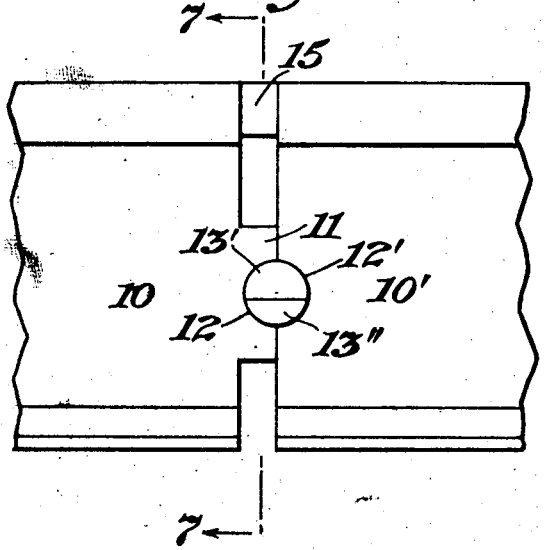
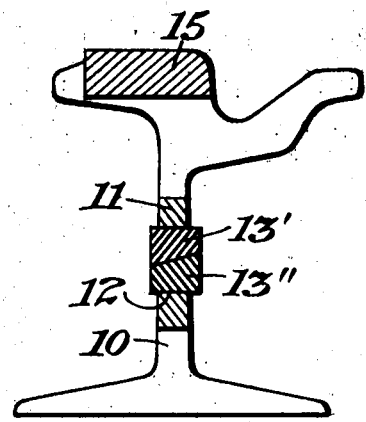

Patented July 23, 1929.

1,721,548

UNITED STATES PATENT OFFICE.

JOHN H. DEPPELER, OF WEEHAWKEN, NEW JERSEY.

METHOD OF WELDING RAILWAY RAILS AND THE LIKE.

Application filed January 28, 1928. Serial No. 250,201.

The invention relates to an improvement in the method of welding railway rails and the like by means of superheated molten metal cast in a mold surrounding the rail ends, and the object of the invention is to support and maintain the ends of the rails in accurate alignment during the welding and the operations incident thereto, without interrupting traffic. To this end, the invention comprises the fixing of the adjacent rail ends against relative movement by forcing a locking member between said ends and into notched engagement therewith, the locking member preferably taking the form of a wedge which is driven into preformed notches in the ends of the adjacent rail webs.

The invention is illustrated in the accompanying drawings, in which:—

Figs. 3, 4, 5 and 6 are similar views to that of Fig. 2 showing modified modes of application of the invention.

Fig. 7 is a transverse section on line 7—7 of Fig. 6.

Figure 1:
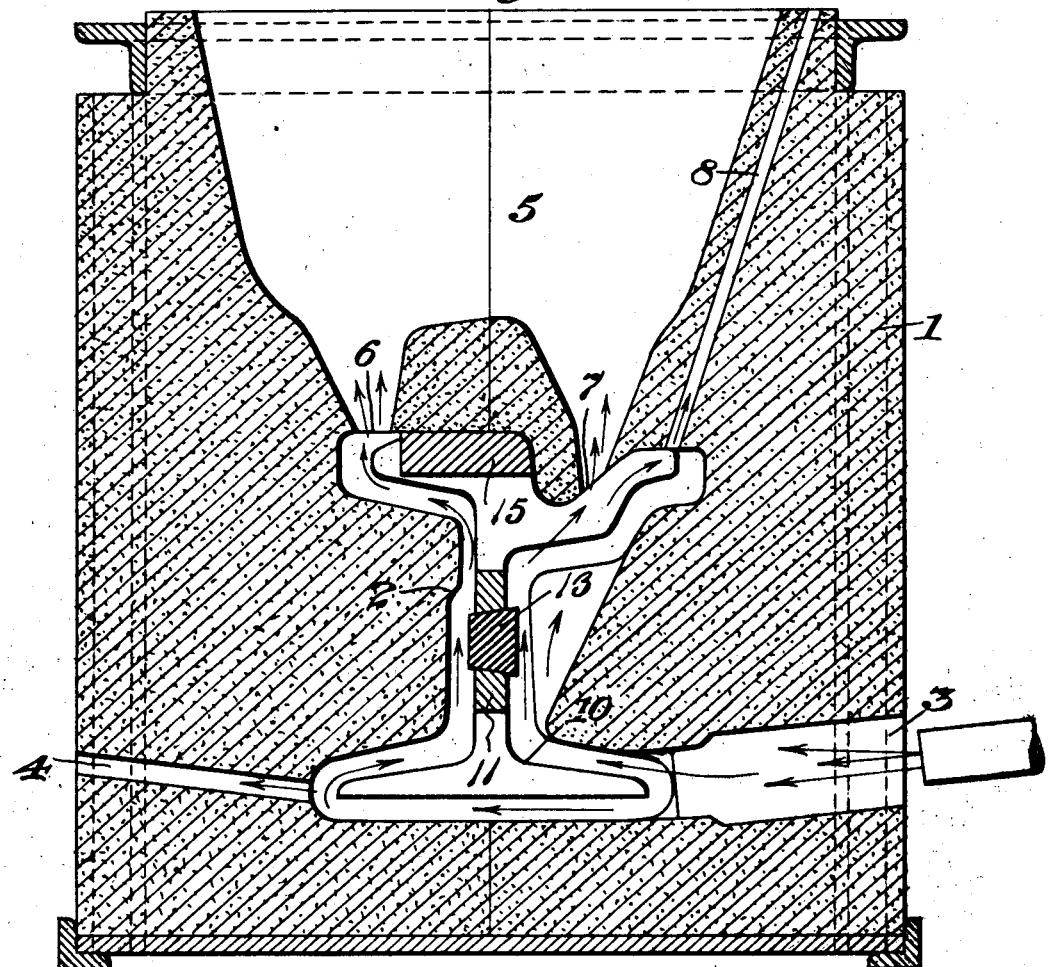
Fig. 1 is a vertical transverse section through a typical welding mold in which the invention may be practiced.
Figure 2:
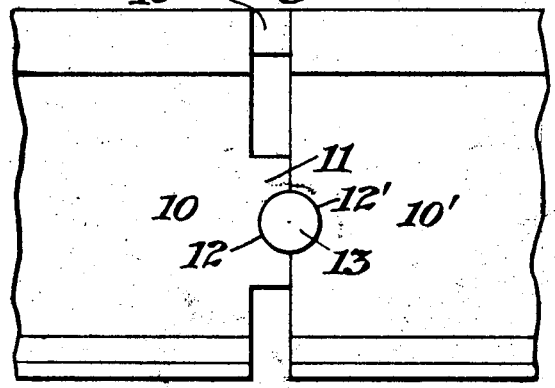
Fig. 2 is a fragmentary side elevation of the rail ends adjacent the welded joint showing one mode of applying the locking member.

Referring to Figs. 1 and 2 of the drawings, 1 indicates a typical sectional mold surrounding the adjacent ends of the rails to be joined by an alumino-thermic or similar weld formed by superheated molten metal which is tapped into the mold to fill the mold space 2 surrounding the adjacent rail ends and the intervening space or gap between said rail ends. The mold is provided with the usual preheating gate 3 opening into the bottom of the mold cavity into which the flame of a blow torch or other suitable heating means is directed for the purpose of drying out the mold and heating the ends of the rails within the mold preparatory to pouring the molten metal to effect the joint. Opposite the heating opening is a venting duct 4. The upper part of the mold is provided with the usual basin 5, which communicates with the mold space 2 by means of pouring gates 6 and 7 and a vent or riser 8.

In effecting the welding together of the rails, such as 10, 10′, the ends of said rails are enclosed within the mold 1, the ends of the rails being separated by a gap, which, as illustrated in Figs. 1 and 2, is defined by an integral projection 11 on the end of one of the rails, which projection is of less cross sectional area than the rail end and serves, in part, to prevent the rail ends expanding toward each other during the preheating operations, which would have the effect of reducing the width of the gap. Preferably, an insert 15 is applied between the upper portions of the rail heads, in substantially the manner and for the purpose disclosed in Letters Patent No. 1,153,435, dated September 14, 1915, said insert comprising a shim of metal of the same character as that of the rails and conforming generally to the contour of the tread and gage faces of the rails, and also being integrally connected to the rail ends by the welding operations to afford a bridging element to the gap which will prevent scouring out of the metal at the joint under the wheels of traffic.

In preparing the rail ends for the welding operations, obviously, considerable time is required in removing the fish plates or tie bars, forming the gap, placing the mold in position and preheating, and, unless suitable means are provided for supporting the ends of the rails during these preliminary operations, traffic will have to be suspended, otherwise the weight of the vehicles traversing the rails will displace the ends of the latter and an unsatisfactory joint will result, if the welding operation is attempted without realigning the ends of the rails. Various expedients have been provided for supporting the ends of the rails, such as the provision of heavy connecting yokes straddling the respective rail ends, connected by side bars or frames which, in some instances, have been associated with or formed as parts of the mold box frame. These expedients have not proven altogether satisfactory, however, because of the cost of such installations, the time required to apply the same, and, principally, because devices of this character are ineffective to support the rail ends adjacent the joint and prevent displacement of the latter under the wheels of traffic passing over the rails while the preliminary operations incident to the welding are being carried out.

The instant invention is designed to obviate all of these difficulties and nevertheless to effect an efficient interlocking of the rail ends at the point of juncture, which will cause the rail ends to be mutually and rigidly self-supporting, so that the ends of the rails will not be deflected out of the necessary registering and aligning relation, by traffic, during the preliminary operations of preparing the rail ends for welding. This result is obtained by forcing a locking member between the adjacent ends of the rails into notched engagement with each rail end. This may be effected by actually driving a wedge or similar element between the rail ends, so as to cause the wedge to bite into and form notches in the faces of the rail ends. However, the preferable procedure is to preform notches, such as 12 and 12′, in the adjacent ends of the webs of the rails 10, 10′, as illustrated in Figs. 1 and 2, into which notches a metal tapered pin 13 is driven, the wedging pin constituting a lock between the rail ends of such character that any movement imparted to one rail will be transmitted through the lock to the other rail and the two ends of the rail will move together as one without disturbing the registry and alignment of the rails. Preferably, the notch and pin interlock between the rail ends is located at or above the neutral axis of the rails, so that any downward movement of the rail ends due to the wheels of traffic will tend to tighten the engagement between the tapered pin and the notches. It will be seen, therefore, that the pin and notch interlock between the rail ends prevents any relative movement between the ends of the rails, such as might cause a cracking or spalling of the surrounding refractory mold, and preserves said rail ends in rigid and accurate registry and longitudinal alignment, which conditions are necessary to the production of a satisfactory welded joint.

It is evident that many modifications of the interlocking joint, both as to the form and location of the latter, are possible, without departing from the fundamental principles of the invention. A number of such modifications are shown. For example, in Figs. 1 and 2, the projection 11 formed between the head and base of one rail section abuts the web of the other rail section, so that the registering notches 12, 12′ are semi-circular and the pin 13 finds a complete circular bearing or seat in and between the rail webs.

Figure 3:
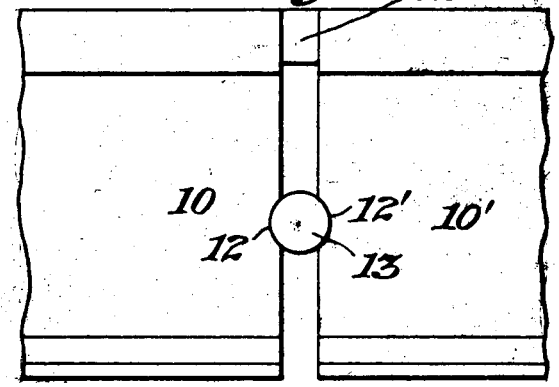

In Fig. 3, the gap between the rail ends is defined and maintained by the insert 15 between the heads of the rails, and the notches 12, 12′ are formed directly in the webs of the rails as arcuate depressions to receive the round tapered pin 13.

In Fig. 4, the gap between the rail ends is defined by cutting away practically all of the base and web portion of one rail end, leaving a projection 11′ on one rail head, forming what is known as an "attached" insert, which abuts the adjacent rail head to serve in the same way as the loose insert 15 shown and described in connection with the other figures. In this view, two pin-and-notch interlocks are provided, one in the webs of the rails to prevent relative motion up or down, and the other in the bases of the rails to prevent any torsional motion of the rail ends.

Fig. 5 shows an interlocking pin-and-notch connection located just below the heads of the rails, with the loose insert 15 resting on the pin to be supported thereby against displacement preliminary to and during the welding operation.

In Figs. 6 and 7, a further modification is shown in which the rail ends are first prepared as in Figs. 1 and 2, with the registering semi-circular notches formed in the web of rail 10′ and the projection 11 on the web of rail 10, the circular opening formed by the registering notches receiving a double wedge split pin consisting of sections 13′, 13″ inserted from opposite sides of the rails and driven firmly into position to effect the interlock.

The tapered pins or wedges employed as the locking element are preferably a little longer than the thickness of the rail webs and need not be over one inch to one and a half inches in diameter and, if the notches to receive the pins or wedges are located at or near the neutral axis of the rails, the interlock will not interfere with the preheating of the mold and the rail ends or with the carrying out of the welding operation by the superheated molten metal poured into the mold. As a mater of fact, the preheating actually effects a tighter wedging action between the pin and notches in the rail ends due to the expansion of the pin or wedge.

It is obvious that other forms of wedges or, locking pins may be employed and variously positioned with respect to the ends of the rails, from the heads to the bases of the latter, inclusive, but, in any case, in order to be effective, the form, position and location of the notches and pin or wedge forming the lock should be such that any motion of one rail end will be transmitted through the pin to the other and, therefore, no relative motion between the rail ends within the mold could take place. It will also be apparent that, in the case of relatively resilient rails or foundations of a roadbed, it may be of special advantage to use two pin-and-notch interlocks between the ends of the rails to be welded, one above and one below the neutral axis, as indicated generally in Fig. 4, so that the negative as well as the positive bending movements under traffic will be taken care of.

What I claim is:

1. The improvement in the art of welding rails by superheated molten metal cast in a mold surrounding the rail ends, which comprises fixing the adjacent rail ends against relative movement by forcing a locking member between said ends into notched engagement with each.

2. The improvement in the art of welding rails by superheated molten metal cast in a mold surrounding the rail ends, which comprises forming transverse notches in the adjacent rail ends and forcing a locking member into bridging engagement with said notches.

3. The improvement in the art of welding rails by superheated molten metal cast in a mold surrounding the rail ends, which comprises fixing the adjacent rail ends against relative movement by forcing a locking member between said ends into notched engagement with each, and placing an insert between the heads of the rails with its lower edge resting on said member.

4. The improvement in the art of welding rails by superheated molten metal cast in a mold surrounding the rail ends, which comprises fixing the adjacent rail ends against relative movement by forcing a locking member between said ends into notched engagement with each above the neutral axis of the rails.

5. The improvement in the art of welding rails by superheated molten metal cast in a mold surrounding the rail ends, which comprises fixing the adjacent rail ends against relative movement by forcing a locking member between said ends into notched engagement with each above the neutral axis of the rails, and placing an insert between the heads of the rails with its lower edge resting on said member.

6. The improvement in the art of welding rails by superheated molten metal cast in a mold surrounding the rail ends, which comprises fixing the adjacent rail ends against relative movement by forcing locking members between said ends into notched engagement with each, one member being located above and the other below the neutral axis of the rails.

7. The improvement in the art of welding rails by superheated molten metal cast in a mold surrounding the rail ends, which comprises fixing the adjacent rail ends against relative movement by forcing locking members between said ends into notched engagement with each, one of the members being located in the bases of the rails to prevent torsional motion of the rail ends.

8. The improvement in the art of welding rails by superheated molten metal cast in a mold surrounding the rail ends, which comprises fixing the adjacent rail ends against relative movement by forcing locking members between said ends into notched engagement with each, one of the members being in the webs of the rails to prevent relative motion up or down and the other in the bases of the rails to prevent torsional motion of the rail ends.

In testimony whereof I affix my signature.

JOHN H. DEPPELER.